Patented Sept. 11, 1951

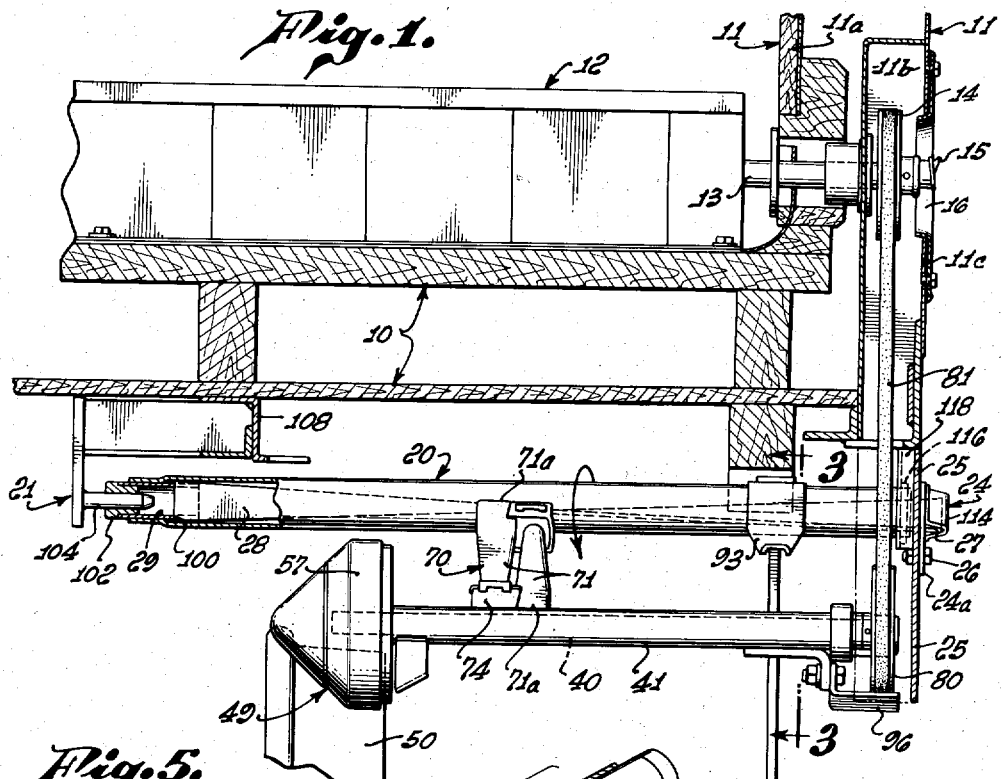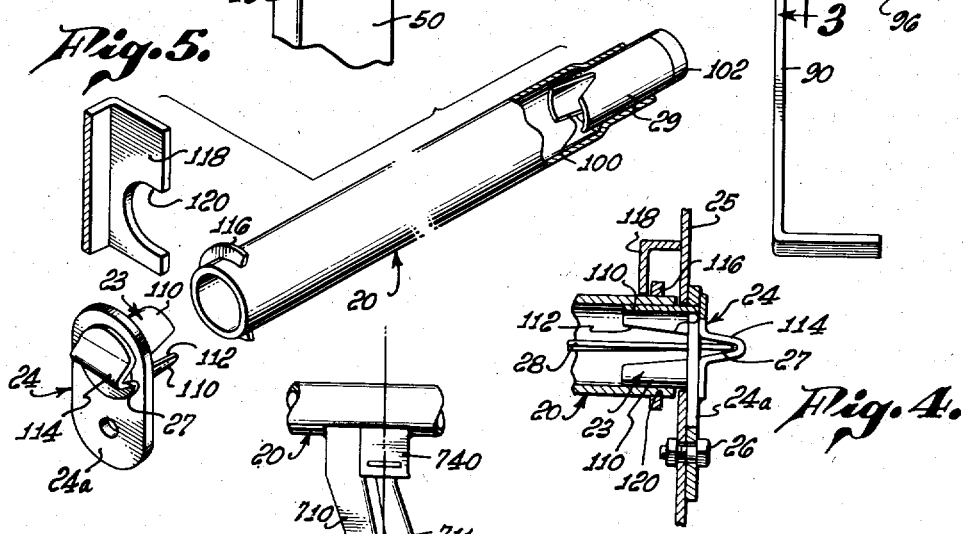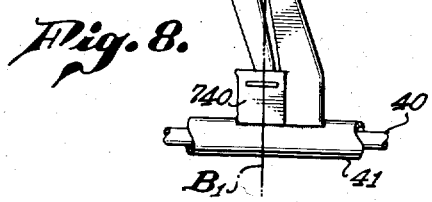

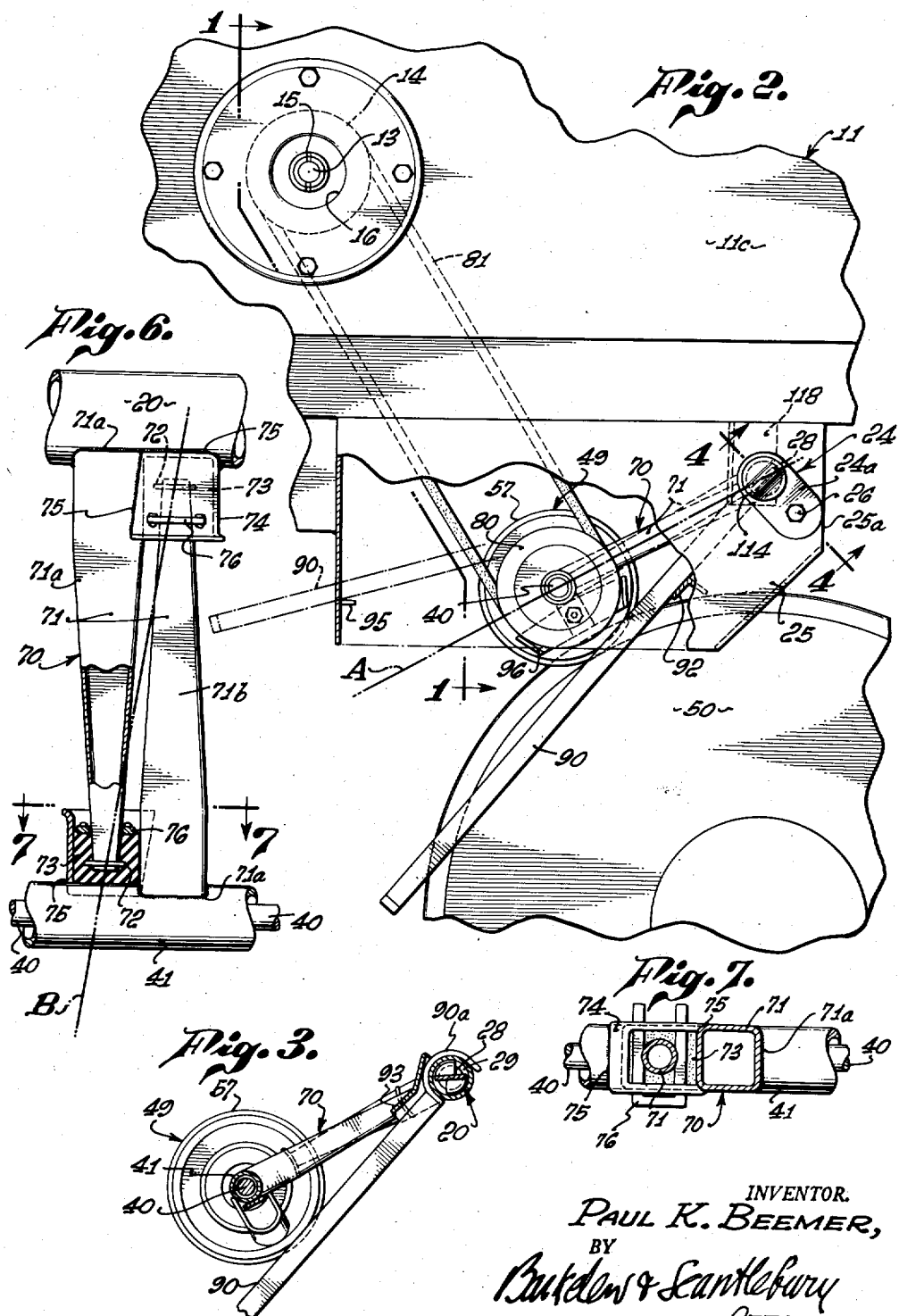

2,567,504

UNITED STATES PATENT OFFICE 2,567,504

DRIVING MECHANISM FOR ACCESSORIES IN TRANSPORT VEHICLES

Paul K. Beemer, Pasadena, Calif., assignor to Preco Incorporated, Los Angeles, Calif., a corporation of California Application May 16, 1950, Serial No. 162,198

1 Claim. (Cl. 105—112)

This invention relates to certain improvements in drive mechanisms of the types shown in Patent 2,413,158, William E. Van Dorn, issued December 24, 1946, and in the pending application of Paul K. Beemer and Henry O. Fuchs, Ser. No. 667,803, filed May 7, 1946, now Patent No. 2,519,170. The subject-matter of said patent is a drive mechanism which includes a mounting shaft journalled in a transverse position on the under side of a car body, and a drive shaft carrier carried by the mounting shaft in such manner that, urged by a spring, the two ends of the driving shaft are urged, independently of each other, in the same general direction. Transmission elements, such as a traction roller on one end of the drive shaft and a belt sheave on the other, are thus urged into effective power transmission relation with the wheel and axle unit of the car and with a transmission belt.

In that general type of drive mechanism, said copending application introduces certain improvements which, among other things, provide for the use of a torsion spring which is mounted within a hollow mounting shaft, and provide a simplified mounting of the drive shaft carrier on the mounting shaft. This present application is concerned with certain further improvements in that simplified mounting, particularly with a view to the inexpensive manufacture of a rugged and durable device. Certain other improvements have to do with the journal mounting of the mounting shaft. These and other improvements and preferred details will be best understood from the following detailed description of preferred embodiments, reference for that purpose being had to the accompanying drawings in which:

Fig. 1 is a vertical section, in the plane indicated by line 1—1 on Fig. 2, showing the application of a preferred and illustrative form of the invention to a railway car;

Fig. 2 is a side elevation of the subject of Fig. 1, certain parts being broken away for illustrative purposes;

Fig. 3 is a detail section on line 3—3 of Fig. 1;

Fig. 4 is an enlarged detail section on line 4—4 of Fig. 2;

Fig. 5 is an expanded perspective of parts which are partially shown in Fig. 4;

Fig. 6 is an enlarged fragmentary detail of the mounting arm structure by which the drive shaft carrier is mounted on the mounting shaft;

Fig. 7 is a detail section on line 8—8 of Fig. 6; and

Fig. 8 is a schematic plan of parts corresponding to those shown in Fig. 6 and showing a modification.

Like the mechanisms of the previous patent and application, the present improved driving mechanism is generally applicable to the driving of various types of accessories from the running gear of a vehicle. It has been designed particularly with a view to the driving of an air impeller for railroad car ventilation and for air circulation in refrigerator cars, and, will be so described in the following detailed specification but without limitation thereto.

In the drawings, parts of a typical car body structure are shown, including floor structure 10 and side wall structure 11. A typical air impeller unit, such as that set out in the Van Dorn patent above referred to is shown at 12, and its driving shaft is shown at 13. For the purposes of my invention the driving shaft 13 is not necessarily the shaft which directly drives air impeller 12; it may be any shaft through which any accessory is driven. In this particular illustration, however, the air impeller is mounted on the car floor with its shaft extending transversely of the car, and it is most convenient and simple to extend that shaft 13 outwardly through or into the side wall structure 11 and to apply the drive transmission from the driving shaft of the drive mechanism directly to that extended drive shaft 13. Accordingly, as here shown, the accessory driving shaft 13 extends out through the inner facing 11a of the car wall into and through a recess 11b which is formed in the car wall. In that recess shaft 13 is equipped with a driving sheave 14; and at its end the shaft 13 is equipped with an auxiliary drive adapter 15 which lies in an opening 16 in the exterior wall sheathing 11c and substantially flush with the outer surface of that sheathing.

Under the car floor a hollow mounting shaft 20 is hung from the car body in a position substantially horizontal and transverse of the length of the car. At its inner end shaft 20 may be rotatably supported on a bearing bracket 21 which is mounted upon any suitable part of the under-floor structure. At its outer end (see Fig. 4) shaft 20 is mounted to rotate on the inwardly projecting plug-like end part 23 of a fitting 24 which is mounted in or includes supporting plate or flange 24a. (See Figs. 4 and 5 for the later described details of this mounting.) Fitting 24 is rotatably settable in plate 25 secured to the car framing, and is secured to the plate in any set position by the stud or bolt 26. The fitting is slotted or notched at 27 to receive one end of a flat torsion spring 28 which lies within hollow shaft 20 and whose other end (see Figs. 1 and 5) is held in a slotted or notched member 29 fixed in shaft 20 in any suitable manner. By proper setting of fitting 24, flat spring 28 is put under an initial torsional strain which tends to rotate the shaft 20 and the parts attached thereto in the direction indicated by the arrows in the several views, counter-clockwise as viewed in the aspects of Figs. 2 and 3. The fitting may then be secured in its set position by the bolt 26. To accommodate the rotational adjustment of the fitting either it or plate 25 might be provided with slotted openings or a series of bolt holes. These are not shown in the drawings, the illustration being based on the supposition that bolt holes are drilled through plate 25 in the positions which suit the selected position of the fitting.

The driving shaft 40 is mounted in bearings (not shown) in a tubular shaft carrier 41. Driving shaft 40 is driven at its inner end (its end closer to the car center) from the running gear of the car; from some element which rotates with the wheel and axle unit, and preferably directly from a car wheel, such as the car wheel illustrated at 50. Driving from the car wheel, the drive is preferably through a traction roller 49 which normally engages the tread of the wheel.

Shaft carrier tube 41 and shaft 40 are supported on mounting shaft 20 in such a manner that 40 and 41 are movable as a whole about the transversely extending axis of mounting shaft 20, and also in such a manner that each end of drive shaft 40 is allowed independent movement in the same general direction. The shaft carrier tube 41 is supported from mounting shaft 20 by an arm structure 70 which supports the carrier at a single selected medial point in such manner that that medial point of the tube is carried by the arm structure in a circular path around the axis of mounting shaft 20, and in such manner that the carrier may also swing about that medial point in a plane which is substantially normal to the radial extent of the arm structure, or about the radial axis of the arm structure. Details of this are described later.

Tube 41 and driving shaft 40 are supported in such a position that the tread face 57 of the traction roller is normally in about the central plane of the car wheel tread as shown in Fig. 1, and a belt sheave 80 on the other or outer end of drive shaft 40 is in the plane of sheave 14 on accessory driving shaft 13. A driving belt 81 encircles the two sheaves. The torsional strain of torsion spring 28, tending to rotate the parts in the relative directions indicated, tends at all times to press the traction roller against the car wheel tread and also to move sheave 80 downwardly away from sheave 14 and to keep driving belt 81 tight. With any given setting of spring 28 the relation of the forces which press the traction roller against the car wheel and which tense the driving belt depends upon the location of the chosen medial point at which 40 is supported, that is, upon the relative spacings of that point from the traction roller and from sheave 80. In the relative position shown in Fig. 1 the force applied to the traction roller is the greater, but that relative position may be varied as is found desirable.

The relative movement between the car body and car wheel include relative vertical movement of the spring-supported body, and relative swivelling movements of the car wheel about the swivelling axis of the truck. In following the car wheel during both such relative movements the traction roller moves up and down in a line of movement which is generally about the axis of mounting shaft 20, while sheave 80 and the outer end of driving shaft 40 remain substantially stationary. In operation, the only vertical movement of sheave 80 and its end of the shaft is the slight movement which takes place under the pressure of spring 28 to keep belt 81 tight as it stretches or shrinks. Thus, in practical operation the supported medial point of shaft carrier 41 and of driving shaft 40 swings up and down in a plane around mounting shaft 20 and the carrier and shaft also swing essentially about an axis which passes transversely through shaft 40 at sheave 80 and which is generally represented by the dash line A in Fig. 2.

In driving mechanisms of the type here under consideration it is desirable to provide means for disabling the drive and to disengage both the power transmissions when operation of the accessory is not desired during car travel, or for operating the accessory by an auxiliary drive. Such an auxiliary drive may be applied through the fitting 15 as described in the previous patent and application. For disengaging the transmission an arm 90 is loosely pivoted at one end on the mounting shaft and normally rests on a supporting lug 92 which projects inwardly from mounting plate 25. When arm 90 is manually swung up to such a position as that indicated in dotted lines in Fig. 2, it swings up under shaft carrier 41 near sheave 80 to lift the carrier and sheave, and also swings up and liftingly engages a member 93 which is rigidly mounted on mounting shaft 20. Thus, when arm 90 is swung up and hooked in upper position on a lug such as indicated at 95, mounting shaft 20 is rotated in clockwise direction in Figs. 2 and 3, swinging arm structure 70 upwardly and lifting shaft carrier 41 at the point of arm support of the carrier. By that action traction roller 49 is also lifted to disengage it from the car wheel at the same time that sheave 80 is lifted. When the sheave is lifted, belt guards 96, mounted on carrier 41 lift the belt 81 to lift its upper part off sheave 14.

The structures, as they have been so far generally described, are similar to those set out in said prior application, to which reference may be had for further details and the particulars of operation of a mechanism of this type wherein the driving shaft carrier is supported from the mounting shaft at a single medial point about which it swings on the supporting arm structure in a plane generally parallel to the mounting shaft and generally normal to the radial extent of the arm structure. The following now describes the improvements which are the particular subject matter of this present application.

As before mentioned, the inner end of the flat torsion spring 28 is mounted in a member 29 at the inner end of mounting tube 20. This member 29 is here made in the form of a hollow cylinder or sleeve with opposed V-notches 100 in one end of its wall to receive the spring end. Sleeve 29 is rigidly set in the inner end of 20 in any suitable manner, as by shrink fitting or welding. In its external end it carries a bored plug 102, preferably of rubber or similar material, which serves as one member of a relatively rotatable mounting for the inner end of the mounting tube, the other member being the pin 104 carried by bracket 21 which is made of such form and dimensions as to be mounted in any suitable manner on the under-floor structure, for instance on an angle 108 and support pin 104 in approximately the correct position. Pin 104 is long enough that no particular accuracy is necessary in setting its distance from the mounting plate 25 which determines the position of the outer end of the mounting tube 20. The relation of the two relatively rotatable members 102 and 104 might be reversed; that is, the fixed one might be hollow to take either member 102 or the end of tube 20; but the illustrated form is simpler and preferred. Preferably the rubber plug or bushing 102 fits pin 104 tightly, so that relative rotation, and any other relative movements of the parts, are allowed by rubber distortion rather than by frictional surface movement.

As has been stated, the other or outer end of tube 20 is supported on fitting 24 mounted on plate 25. As illustrated, this fitting has a plate or flange 24a adapted to be bolted or otherwise secured against the outer face of plate 25 in its adjusted, spring stressing, position. The plug portion 23 of the fitting, which projects through plate 25 and journals the outer end of tube 20, is here formed of two sleeve segments 110 each secured to or formed integrally with flange 24a and separated by notches 112 of sufficient width to freely accommodate the helix angle to which the spring is stressed. Spring 28 preferably has a width nearly equal to the internal diameter of tube 20; otherwise the notches at 112 would not be necessary. The internal opening of the tubular formation 23, 110, is continued through flange 24a and the extreme outer end of spring 28 seats in the V-shaped notch 27 formed in a member 114 secured to or formed integrally with plate-flange 24a. Preferably the fitting structure is made by providing flange 24a with a hole large enough to pass the tubular structure 23, 110. That tubular structure is welded to member 114 and that member is then welded to flange 24a with 110 projecting through 24a.

In the preferred structure as shown, the abutment or near abutment of the outer end of tube 20 against the inner face of plate 25 confines the mounting tube against outward axial movement. To confine it against inward axial movement a flange 116 on tube 20 is confined against inward movement by a bracket 118 mounted on the inner face of mounting plate 25. As illustrated, bracket 118 has a notch 120 in one edge for receiving tube 20 with flange 116 outward of the bracket. In assembly on a car, after mounting plate 25 and its attached parts have been permanently mounted on the car framing and mounting pin 104 has been mounted approximately in correct position, the whole assembly of 20, 70, 41 and its carried parts, and lever 90, can be quickly put in place by moving it into approximate position with journal plug 102 on the tapered end of pin 104 and with the outer end of mounting tube 20 projecting outwardly beyond plate 25 in a position against or close to plate edge 25a. That edge is close enough to the final mounted position of tube 20, that, with the distortability of rubber bushing 102 it can then be slid over the pin. With the outer end of 20 inside the inner face of plate 25, tube 20 is then swung horizontally into the notch 120 (which preferably opens horizontally). The notch then registers tube 20 in approximate position for receiving the journal portion 23 of fitting 24 which, after inserting spring 28, is next inserted in place. With the stress setting of spring 28 the mechanism is ready for operation.

Insofar as the invention of the present application is concerned, the spring receiving notches at 100 and at 27 may be of any form. The formation, such as a V-notch, which engages the extreme spring end exclusively is, in itself, not the subject of the present invention but is the subject matter of a copending application of Paul Z. Anderson, filed on May 22, 1950, Ser. No. 163,528.

Manual lift arm 90 has on its pivoted end a hook formation 90a which is hooked around mounting tube 20 under the member 93, in the pre-assembly of the mechanism before placement on the car. Abutment member 93 is here in the form of a saddle welded to tube 20 and overlying arm 90 to take the lift of the arm and also to confine the arm axially on the tube.

The supporting arm structure specifically shown in said copending application comprises what may be described as an arm containing a swivel, such as an arm with two relatively rotatable parts. The improved arm structure of the present invention has advantages of ruggedness, durability due particularly to lack of wearing parts, cheapness of construction, and inexpensiveness of replacement of any deteriorated parts.

The arm structure 70 as here shown is composed of two preferably duplicate elements embodying two arm elements 71 one rigidly secured to mounting shaft 20 and the other to shaft carrier 41, as by welding at their larger base ends at 71a. These arm elements lie closely alongside each other. They can be and preferably are formed of sheet metal with squarish bases and round at their outer ends where they are provided with enlargements or flanges 72. These outer flanged ends are held in rubber or similar bushing blocks 73 in socket boxes 74 which are secured, as by welding 75, to tubes 20 and 41 and to the bases of arm elements 71. Keys 76, passed through openings in the box walls, hold the rubber blocks compressed in place. The rubber blocks preferably fit tightly around the flanged arm ends and also tightly by precompression in the boxes, so that relative movements between the arm elements and tubes 20 and 41 are allowed by rubber distortion rather than by relative frictional movement. The arm structure thus has no relatively moving parts which need to be machined or formed with any particular accuracy, and has no frictionally wearing parts. While a merely loose or free fit of the arm ends in the sockets would allow of the necessary relative movements, such fitting involves frictional contact and wear. It is pointed out that, due to the spacing of the two arm-receiving sockets by approximately the full arm-length, the pressures exerted on the relatively moving parts by the reaction forces generated at roller 49 and sheave 80 are relatively small. However the precompressed rubber bushing blocks, allowing the same freedom as a loose fit, are preferred because, without involving surface friction and wear, they allow all the necessary movements by distortion and without any free looseness. And the rubber blocks are easily replaced when deteriorated.

The action of the arm structure 70 is, in general substance, to support and guide the selected medial point of shaft carrier 41 in a movement of translation along a line transverse of mounting shaft 20 (specifically, in an arcuate movement about that shaft); to transmit the force of the stressed spring to the shaft carrier at that intermediate point; and to allow the shaft carrier to swing about that point in a plane defined generally by its own axis and substantially normal to the radial extent of the arm structure.

The arm element 71a, rigidly mounted on mounting shaft 20, carries the shaft carrier 41 on its outer end in such manner that the carrier can swing about its point of support on the end of that arm element. That point may be taken to be a point on the axis of that arm element near its outer end. The spring pressure is transmitted to the carrier through that same arm element at that point. Arm element 71b, rigidly mounted on carrier 41 and flexibly connected with mounting shaft 20 limits that swinging movement of the carrier to a swinging movement about an axis determined by that point of support and a corresponding point in the flexible connection of 71b with 20. Such axis is indicated at in Fig. 6. Such an axis is nearly enough radial of 20 and normal to 41 as to give 41 the desired swinging freedom. The swinging axis could of course be made precisely radial to 20 and normal to 41 by the simple expedient of, for instance, off-setting the arm elements in such a manner as schematically illustrated in Fig. 8, where B1 indicates the resulting radial and normal axis. In that figure 710 and 711 are the two offset arm elements mounted respectively on 20 and 41 and flexibly connected at the two directly opposed sockets 740. But the simple structure and arrangement shown in Fig. 7 has been found adequate for all practical purposes.

I claim:

Driving mechanism of the character described for driving a car-body-mounted accessory from the wheel and axle element supporting the car body; said driving mechanism including a mounted shaft rotatably mounted on the car body, spring means connected to the body and to the rotatable mounting shaft and urging its rotation in one direction, a driving shaft in spaced relation and normally substantially parallel to the mounting shaft, a shaft carrier on which the driving shaft is rotatably journalled, means for supporting the shaft carrier on the mounting shaft at substantially a single point intermediate the ends of the driving shaft and for applying the spring-impressed torque of the mounting shaft to the shaft carrier at that single point, said supporting means comprising an arm rigidly attached to the mounting shaft and having radial extent therefrom, socket means by which the shaft carrier is mounted at said single point on the free end of said arm, another arm rigidly attached to the shaft carrier at a point immediately adjacent said socket means and extending its free end to a point immediately adjacent the rigidly attached end of the first mentioned arm, and socket means connecting the free end of the second mentioned arm to the mounting shaft, whereby said single intermediate point of the shaft carrier is swung about the rotation of the mounting shaft and the shaft carrier has swinging movement about said intermediate point restricted to a plane substantially normal to the radial extend of said arms; and two power transmitting means one between one end of the driving shaft and the wheel and axle element and the other between the other end of the driving shaft and the accessory, both power transmitting means being rendered effective by movements of the shaft in said plane.

PAUL K. BEEMER.

REFERENCES CITED

The following references are of record in the file of this patent:

UNITED STATES PATENTS

| Number | Name | Date |
| --- | --- | --- |
| 1,995,245 | Funk | Mar. 19, 1935 |
| 2,014,467 | Cheyney | Sept. 17, 1935 |
| 2,196,702 | Leighton | Apr. 9, 1940 |
| 2,308,311 | Saurer | Jan. 12, 1943 |
| 2,332,264 | Saurer | Oct. 19, 1943 |
| 2,413,158 | Van Dorn | Dec. 24, 1946 |

Certificate of Correction

Patent No. 2,567,504 September 11, 1951

PAUL K. BEEMER

It is hereby certified that error appears in the printed specification of the above numbered patent requiring correction as follows:

Column 6, lines 8 and 9, for "May 22, 1950, Ser. No. 163,528" read *May 23, 1950, Ser. No. 163,776*; column 7, line 20, for "at in" read *at B in*; line 39, for "mounted shaft" read *mounting shaft*; column 8, line 19, after "about the" insert *mounting shaft axis by the spring impressed*;

and that the said Letters Patent should be read as corrected above, so that the same may conform to the record of the case in the Patent Office.

Signed and sealed this 25th day of December, A. D. 1951.

[SEAL]

THOMAS F. MURPHY,
*Assistant Commissioner of Patents.*